United States Patent [19]
Schilham

[11] Patent Number: 5,828,001
[45] Date of Patent: Oct. 27, 1998

[54] PLASTIC JUNCTION BOX WITH RECEPTACLE BOXES

[75] Inventor: Jan J. Schilham, Leusden, Netherlands

[73] Assignee: Guilford (Delaware), Inc., Guilford, Me.

[21] Appl. No.: 715,787

[22] Filed: Sep. 19, 1996

Related U.S. Application Data

[63] Continuation-in-part of Ser. No. 389,753, Feb. 15, 1995, Pat. No. 5,673,522.

[60] Provisional application No. 60/005,178 Sep. 29, 1995.

[51] Int. Cl.[6] .................................................. H01R 13/516
[52] U.S. Cl. .................................................. 174/58; 174/49
[58] Field of Search ................................. 174/58, 48, 49, 174/50; 220/3.8, 3.92, 3.94, 4.02; 52/220.5, 220.7, 263

[56] References Cited

U.S. PATENT DOCUMENTS

| | | | |
|---|---|---|---|
| 1,402,769 | 1/1922 | Hirshfeld | 174/50 X |
| 1,861,359 | 5/1932 | Pyron . | |
| 2,089,893 | 8/1937 | Greulich . | |

(List continued on next page.)

FOREIGN PATENT DOCUMENTS

| | | |
|---|---|---|
| 0197957B1 | 10/1986 | European Pat. Off. . |
| 0218108A2 | 4/1987 | European Pat. Off. . |
| 0218108B1 | 4/1987 | European Pat. Off. . |
| 0352435A3 | 1/1990 | European Pat. Off. . |
| 1133496 | 3/1957 | France . |
| 1307901 | 9/1962 | France . |
| 1547666 | 11/1968 | France . |
| 1601001 | 9/1970 | France . |
| 2041599 | 1/1971 | France . |
| 2483990 | 12/1981 | France . |
| 1196345 | 7/1965 | Germany . |
| 2102050 | 1/1971 | Germany . |

(List continued on next page.)

OTHER PUBLICATIONS

Cat. No. NF873E, "For Modern Offices, Network Floor (Flexible Floor Cabling System)," Brochure, Kyodo Electric Co., Ltd., Tokyo, Japah ( Mar. 1987).
Installationsboden, "zur flexiblen Kabelverlegung unter Bodenbelagen—bevorzugt unter Teppichfliesen—mit flachendeckendem Zugang fur Kabelsustritte in beliebiger Menge," (pub. after Mar. 19, 1989).
I.G. C328E "High Class Access Floors," Brochure, The Hiross Group (Feb. 1991).
B111E, "Today," Brochure, The Hiross Group (Feb. 1991).
10270/CTE, Buyline 2971, Form 9/92–19M, "Access Flooring Systems," Brochure, C–Tec, Inc. (1992).
SA–10271/1–91, "Access Floor Systems," Brochure, USG Interiors, Inc. (1991).
10270/HIT, Buyline 1976, "Hitachi Access Floor," Brochure, Hitachi Metals America, Ltd. (Oct. 1992).
6574/10270/MUL, "Mult–A–Frame," Brochure, Mult–A–Frame Corporation (1992).
"Access Floors Designed for Today's Business Environments," Brochure, Tate Access Floors, Inc. (Sep. 1988).
"Raised Flooring System H 16," Brochure, Herforder Teppichfabrik Huchzermeyer & Co, GmbH, (English translation on each page, 1989).
"Concealed Service Floor Boxes," Brochure, Steel City ®, (Feb. 11, 1994, Facsimile Transmission Date).

*Primary Examiner*—Dean A. Reichard
*Attorney, Agent, or Firm*—Kikpatrick Stockton LLP; John S. Pratt; Mitchell G. Stokwell

[57] ABSTRACT

A junction box is disclosed that has a centrally located housing with a bottom and four sides joined to form a closed perimeter. One or two receptacle boxes also having bottoms are attached to and surround the housing. The boxes enclose outlets and the cable and wire connections to the outlets, which may be accessed through the centrally located housing. A cover above the receptacle boxes completely encloses the outlets, preventing water and the like from entering the junction box and shorting any electrical connections. Frames sized to accept various types and sizes of outlets slide into tracks located within the receptacle boxes in order to position the outlets easily and securely, yet removably, within the junction box.

12 Claims, 8 Drawing Sheets

OTHER PUBLICATIONS

| | | |
|---|---|---|
| 2,680,775 | 6/1954 | Wiesmann . |
| 2,830,332 | 4/1958 | Pawlowski . |
| 2,867,301 | 1/1959 | Benton . |
| 2,956,785 | 10/1960 | Riehl . |
| 3,025,934 | 3/1962 | Spiselman et al. . |
| 3,110,753 | 11/1963 | Witort . |
| 3,129,396 | 4/1964 | Germain et al. ................. 174/50 X |
| 3,213,980 | 10/1965 | Persson . |
| 3,218,767 | 11/1965 | Stark . |
| 3,295,272 | 1/1967 | Kanno . |
| 3,387,422 | 6/1968 | Wanzer . |
| 3,589,660 | 6/1971 | Dunckel . |
| 3,597,523 | 8/1971 | Guritz ............................. 174/48 |
| 3,616,584 | 11/1971 | Sartori et al. . |
| 3,645,054 | 2/1972 | Olvera . |
| 3,785,110 | 1/1974 | Galloway et al. . |
| 3,815,304 | 6/1974 | Schille et al. . |
| 3,852,928 | 12/1974 | Raith . |
| 3,894,370 | 7/1975 | Parazader . |
| 4,016,357 | 4/1977 | Abrahamsen . |
| 4,026,083 | 5/1977 | Hoyt et al. . |
| 4,035,967 | 7/1977 | Harvey . |
| 4,074,488 | 2/1978 | Ray, III . |
| 4,085,557 | 4/1978 | Tharp . |
| 4,124,324 | 11/1978 | Augis et al. . |
| 4,323,723 | 4/1982 | Fork et al. ................... 174/48 |
| 4,546,580 | 10/1985 | Ueno et al. . |
| 4,558,544 | 12/1985 | Albrecht et al. . |
| 4,573,302 | 3/1986 | Caretto . |
| 4,593,499 | 6/1986 | Kobayashi et al. . |
| 4,596,095 | 6/1986 | Chalfant . |
| 4,648,592 | 3/1987 | Harinishi . |
| 4,662,140 | 5/1987 | Porter et al. . |
| 4,682,453 | 7/1987 | Holmgren . |
| 4,736,555 | 4/1988 | Nagare et al. . |
| 4,744,194 | 5/1988 | Yasuyoshi . |
| 4,761,926 | 8/1988 | Rea et al. . |
| 4,773,196 | 9/1988 | Yoshida et al. ................. 174/48 X |
| 4,780,571 | 10/1988 | Huang . |
| 4,858,401 | 8/1989 | Thorp et al. . |
| 4,864,078 | 9/1989 | Bowman . |
| 4,873,600 | 10/1989 | Vogele ........................... 174/50 X |
| 4,883,503 | 11/1989 | Fish . |
| 4,905,437 | 3/1990 | Heather . |
| 4,923,733 | 5/1990 | Herbst . |
| 4,968,855 | 11/1990 | Le Paillier ..................... 174/48 |
| 4,993,202 | 2/1991 | Thiel . |
| 4,996,810 | 3/1991 | Forde . |
| 5,008,491 | 4/1991 | Bowman . |
| 5,042,569 | 8/1991 | Siegmund . |
| 5,049,700 | 9/1991 | Kobayashi et al. . |
| 5,052,157 | 10/1991 | Ducroux et al. . |
| 5,057,647 | 10/1991 | Bogden et al. . |
| 5,074,085 | 12/1991 | Ueda . |
| 5,082,712 | 1/1992 | Starp . |
| 5,084,596 | 1/1992 | Borsh et al. ................. 174/57 X |
| 5,090,169 | 2/1992 | Takeda et al. . |
| 5,105,595 | 4/1992 | Tokei et al. . |
| 5,184,438 | 2/1993 | Takeda et al. . |
| 5,187,907 | 2/1993 | Takeda et al. . |
| 5,197,244 | 3/1993 | Takeda et al. . |
| 5,245,805 | 9/1993 | Takeda et al. . |
| 5,263,289 | 11/1993 | Boyd . |
| 5,285,009 | 2/1994 | Bowman et al. ................. 174/48 |
| 5,362,922 | 11/1994 | Whitehead ..................... 174/48 |
| 5,392,571 | 2/1995 | Greenfield . |
| 5,400,554 | 3/1995 | Lo . |
| 5,467,609 | 11/1995 | Feeney . |
| 5,468,908 | 11/1995 | Arthur et al. ................. 174/48 |
| 5,483,776 | 1/1996 | Poppe . |

FOREIGN PATENT DOCUMENTS

| | | |
|---|---|---|
| 1759372 | 6/1971 | Germany . |
| 2314463 | 3/1973 | Germany . |
| 2353865 | 10/1973 | Germany . |
| 2650160A1 | 10/1976 | Germany . |
| 3415581 A1 | 4/1984 | Germany . |
| 8807177 U | 6/1989 | Germany . |
| 3801765 | 7/1989 | Germany . |
| 9106389 U | 8/1991 | Germany . |
| 4013985 | 11/1991 | Germany ..................... 174/50 X |
| 145017 | 10/1993 | Rep. of Korea . |
| 145018 | 10/1993 | Rep. of Korea . |
| 377027 | 7/1932 | United Kingdom ............. 220/3.94 X |
| 822738 | 10/1959 | United Kingdom . |
| 876117 | 8/1961 | United Kingdom . |
| 1104490 | 2/1968 | United Kingdom . |
| 1174562 | 12/1969 | United Kingdom . |
| 1425977 | 2/1976 | United Kingdom . |
| 2097836 | 11/1982 | United Kingdom . |
| 2127062 | 4/1984 | United Kingdom . |
| 2188955 | 10/1987 | United Kingdom . |
| 2190936 | 12/1987 | United Kingdom . |
| WO 87/03324 | 6/1987 | WIPO . |
| WO 85/05397 | 12/1987 | WIPO . |
| WO 88/03207 | 5/1988 | WIPO . |

PLASTIC JUNCTION BOX WITH RECEPTACLE BOXES

CROSS REFERENCE TO RELATED APPLICATIONS

This application claims priority to provisional application Ser. No. 60/005,178, filed Sep. 29, 1995, which is a continuation in part of application Ser. No. 08/389,753, filed Feb. 15, 1995 now U.S. Pat. No. 5,673,522, both of which applications are herein incorporated in their entirety by this reference.

BACKGROUND OF THE INVENTION

This invention relates generally to an insulated junction box that organizes and provides access to electrical, data or telecommunications cables or other service lines that are routed through channels formed between a false floor that is supported above an existing floor.

Various flooring systems have been developed that are designed to provide spaces or channels between an existing floor and a false floor supported above the existing floor. The resulting channels are then used to carry various cables, wires, hoses, compressed air lines, power lines, phone lines or water pipes across the floor or to any point within the room. Most such false flooring systems were developed in response to the need for better organization and delivery of power, data and telecommunications cables needed for the plethora of different electronic equipment (e.g., computers, facsimile machines, telephones, modems, etc.) used in modern offices. By providing a false flooring system with multiple channels through which cables can travel, equipment within a room can be readily replaced or moved or new equipment added by accessing the channels within the false floor and removing, reorganizing or adding the appropriate cables.

Such false floors or raised panel floors typically utilize removable panels laid side-by-side upon raised support members in order to afford a free space where conduit, cables, hoses, wires and other computer interconnections can be routed. Many false flooring systems use adjustable jacks at each panel corner as a means of support. The support jacks for such systems are located only at the corners of the panels, which are usually square with sides of 500 to 600 mm. Accordingly, rigidity and mechanical stability of the floor must be achieved through the use of very thick panels, usually 30 to 40 mm thick, sometimes including a framework which transfers the load to the jacks. Due to the loss of usable height, these types of false flooring require an overall height of 150 to 200 mm, which is incompatible with low ceilings in existing buildings and requires new facilities to be built with added height. As an example, if one considers a 200 mm false floor at each level of a thirty-story building, the additional required height becomes six meters, the equivalent of two stories. Installing such a false floor in existing buildings requires the construction of ramps and steps as well as fire and soundproofing barriers. Finally, such structures are sometimes noisy and act as resonators. In any event, installing existing false floors as part of a building renovation or in new construction, is both involved and costly.

U.S. Pat. No. 5,052,157 to DuCroux, et al. (the "DuCroux patent"), incorporated herein in its entirety by this reference, describes a false flooring system that includes base plates with a fairly dense pattern of supports or stand-offs that support false floor plates while providing a network of channels through which cables, hoses and similar service delivery lines can be routed. This system solves many problems previously associated with false floors, including such problems as described above. In addition to forming the false flooring system taught by the DuCroux patent by heat forming or injection molding of a plastic compound such as polystyrene, polyethylene, polypropylene or acrylonitrile, butadiene styrene resin ("ABS"), an alternative, non-combustible material, such as metal, may be formed into the false floor system. Details and the resulting advantages of accomplishing such a construction are fully described in pending U.S. application Ser. No. 08/114,447, filed Aug. 31, 1993, and now U.S. Pat. No. 5,499,476, for "Low Profile Raised Flooring With Metal Support Structure," incorporated herein in its entirety by this reference.

However, while much effort has been expended in developing false flooring systems, generally little innovation has been directed to providing an interface between the cables traveling within the channels underlying a false floor and the equipment that must be connected to cables traveling within those channels. For instance, the false flooring systems disclosed and claimed in U.S. Pat. Nos. 2,089,893 to Greulich, and 4,905,437 to Heather, each utilize a false floor panel supported by a plurality of projections between and through which cables can pass. A simple aperture, through which a cable can be pulled to connect either to an outlet fitted within the aperture or to a specific piece of equipment, is the only interface provided between the channels beneath and the equipment above the false floor. Such an approach may be appropriate when there are relatively few cables to deal with and skilled personnel are available to wire each electrical, data, telecommunication or other cable to the appropriate outlet or machine; however, a major motivation for using false floor systems has been the great number of cables and interconnections necessary for the various machines residing in the modern office and often used by technically untrained persons.

Other attempts at providing an interface between the office equipment disposed at various points about a false floor and the cables underlying the false flooring system have resulted in complex, difficult to install and/or move structures. For instance, U.S. Pat. No. 5,263,289 to Boyd discloses a box, which must be embedded into the structural floor, for providing service connection points. Additionally, U.S. Pat. No. 4,968,855 to Le Paillier discloses a "distribution slab" for wiring buildings. One embodiment illustrates a slab in which the outlets face upwards, thus requiring that spacing within the channels created between the base and lids be increased where bulky connection devices or plugs will be utilized. Another embodiment places outlets within one or more lids that can be raised or lowered. When the lid is lowered the outlets are inaccessible; however, when it is raised, while accessible, outlets are exposed to the environment and the raised lid and outlet becomes a hazard to those traveling the false floor.

Much like the Le Paillier "distribution slab," U.S. Pat. No. 5,057,647 to Bogden, et al., discloses a "distribution block" that inserts into one of four compatibly shaped knockouts disposed in each corner of a floor plate. Once the appropriate knockout is removed, the distribution block inserts into the knockout and connects with modular electrical "whips" composed of electrical wires and end connectors. Electrical socket outlets and a cover plate are then fixed into the distribution block so that the outlets are exposed. Because the knockouts are formed in flooring plates through perforations, once the perforations are ruptured and the knockout plate removed, there is no means for replacing the knockout. Accordingly, in order to change the position of an already installed distribution block, not only must the block be laboriously unfastened, but the entire floor panel would need to be removed and replaced.

As is described in the prior patent applications identified above, metal junction boxes present numerous benefits. Because such junction boxes conduct electricity, however, in certain applications short circuits can result from contact between wires or cables within or near such boxes and the boxes. Additionally, metal junction boxes can be difficult to make water-resistant or waterproof, and can be expensive to manufacture and install.

It is desirable that a junction box pass Standard IP 2.4.7 so that the associated certificate of approval can be obtained. This International Protection standard involves part 2, involving protection against a water "shower" of ten minutes applied to an installed and closed junction box, part 4, involving a safety standard for accessibility, and part 7, which is a standard for strength.

SUMMARY OF THE INVENTION

The junction box of the present invention may include a centrally located housing having a bottom and four sides joined to form a square. One or two receptacle boxes also having bottoms are attached to each side of the square to provide housings for outlets and the cable and wire connections to such outlets. The outlets are accessible to the centrally located housing so that plugs may be positioned within the housing and received in the outlets. A cover lies above the outlet boxes and provides access to the outlets within the housing through a central hatch or opening in the cover. A junction box manufactured in accordance with the present invention is capable of obtaining certification under IP 2.4.7.

The housing and cover may be formed from a variety of plastic materials, particularly including molded polypropylene, but also including polystyrene, polyethylene, ABS or Polyvinyl Chloride ("PVC").

The junction box acts as an interface between (1) the electrical, telecommunication, data or other service lines traveling through channels formed beneath a false floor and (2) the equipment resting upon the false floor that must connect to the correct service line. Various outlets within the junction box may be provided for electrical, telecommunication or data transmission lines of the flush or forward type or may be pierced with holes for passage of lines through the junction box directly to a specific piece of equipment.

Installation of the cable junction box is accomplished without the necessity for fastening means, such as screws, adhesive or clamps, as the housing of the junction box is shaped to fit tightly between and around the posts or stand-offs which support the false floor plates above the structural floor. The central housing and outlet boxes preferably are fabricated as a single unit but also can be assembled from several components into various shapes, but preferably a square or cruciform, all of which fit tightly between and around the stand-offs supporting a false floor. No special fasteners or other attachment means need be used, as frictional contact between cutouts in a flange or ledge running along the top of the housing and stand-offs will fix the housing in place. Utilizing a housing of this construction, a junction box can be placed at virtually any point in the area covered by a false floor. Accordingly, not only is flexibility of position greatly enhanced, but the junction box readily can be concealed in less traveled areas (e.g., underneath equipment or furniture), yet be conveniently close to equipment so that ready access to outlets within the junction box is provided.

Typically, electrical or other components to which cables connect are often of different sizes, depending either on the type of component or the component supplier. Rather than customizing each housing to accept each type of component, the sides of the housing may include a plurality of standard notches, channels or slots. Frames, formed of plastic or some other, preferably dielectric, material may then be used with particular components or with particular suppliers' components. Each frame may simply slide into and be captured between a pair of opposed notches and thus held in place forming one wall of a receptacle box. The correctly sized cutout for a particular receptacle can be formed in each frame. A variety of frames with different sized component openings can be provided as an installation package to the installer, who will select the proper frame, snap the desired component into place in the frame and slide the frame into the proper notch or hole in the housing. Thus, it is possible with inexpensive, slide-in frames to outfit the junction box with virtually any component demanded by a particular client.

An additional feature of the present invention is a hatch cover shaped to cover the access aperture within the cover, thereby ensuring foreign objects do not enter the junction box, possibly to damage the outlets or cables within, while preventing the junction box from becoming a hazard to persons or objects traveling upon the false floor. Moreover, the hatch cover can be covered with the same carpet or other covering that is used on the flooring plates, thus concealing better the junction box from passers by. A small cable protector in the hatch cover allows it to be fully closed while still providing an egress for one or more cables entering the junction box and connecting to the outlets.

Although designed for use with any of the flooring systems disclosed in U.S. Pat. No. 5,052,157, Reissue application Ser. No. 08/110,656, now U.S. Pat. No. Re. 35,369, patent application Ser. No. 08/114,447, now U.S. Pat. No. 5,499,476, and patent application Ser. No. 08/294,441, now U.S. Pat. No. 5,675,950 which documents are each hereby incorporated herein in their entirety by these references, the present invention can also be adapted for use with other false flooring systems that make use of a plurality of stand-offs to support various floor panels (e.g., U.S. Pat. No. 4,905,437 to Heather) or even upon other appropriate surfaces such as walls. Thus, junction boxes according to this invention may be fabricated to match the heights and shapes of the posts which support the false floor in which the junction box is used or to fit between the studs in a wall. Additionally, junction boxes can be fabricated to the length and shape required to engage with the desired number of posts to obtain thereby the desired size of junction box. More or fewer outlets can be provided within a junction box depending on the number of cables needed to be organized and accessed.

It is therefore an object of the present invention to provide an economical, simple-to-use plastic junction box that interfaces with cables traveling under a false floor and equipment placed at various points about the false floor.

It is another object of the present invention to provide an easily installed junction box that can be placed at virtually any point on a false floor without the need for extensive connection methods or attachment systems.

It is yet another object of the present invention to provide a floor plate with an aperture through which the junction box is accessible regardless of its location in the false floor.

It is a further object of the present invention to provide a hatch cover to cover and protect the junction box and outlets within it from entry of foreign objects while decreasing the hazard that an otherwise open aperture would offer.

It is yet a further object of the present invention to provide a variety of frames that can be used to hold different sized components connecting to the cables and that can easily slide into any one of a plurality of standard sized holes formed in the housing sides.

It is yet an additional object of the present invention to provide a flange through which stand-offs can project in order that the flange encircles the stand-offs completely to provide increased stability to the junction box.

It is yet another object of the present invention to provide a protective guard that prevents contact with the components connecting to the cables by forming a channel into which project portions of the components and through which cables can be routed.

Other objects, features and advantages of the present invention will become apparent with reference to the remainder of the text and the drawings of this application.

DETAILED DESCRIPTION OF THE DRAWINGS

Figure 7:
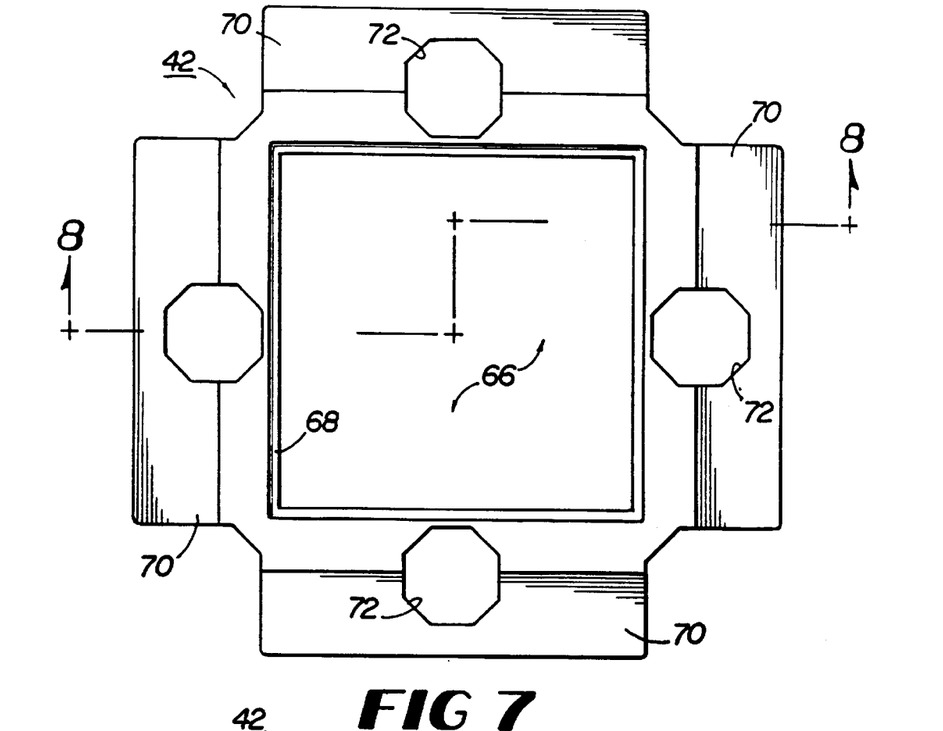
FIG. 7 is a top plan view of the junction box cover of the present invention.
Figure 8:
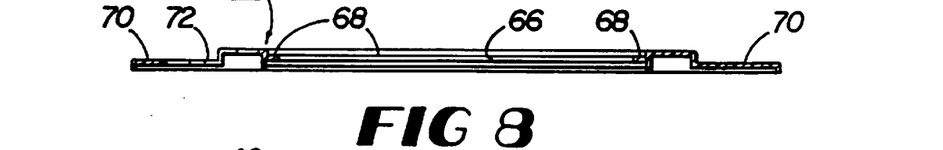
FIG. 8 is a side elevation view, in section, of The junction box cover shown in FIG. 7 taken along line 8—8 in FIG. 7.
Figure 9:
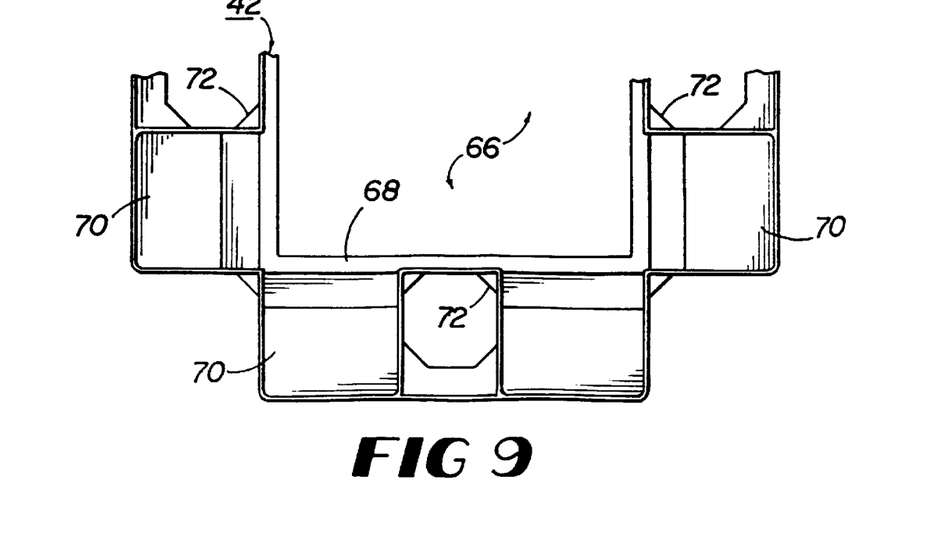
FIG. 9 is a bottom plan view of one-half of the junction box cover shown in FIG. 7.
Figure 10:
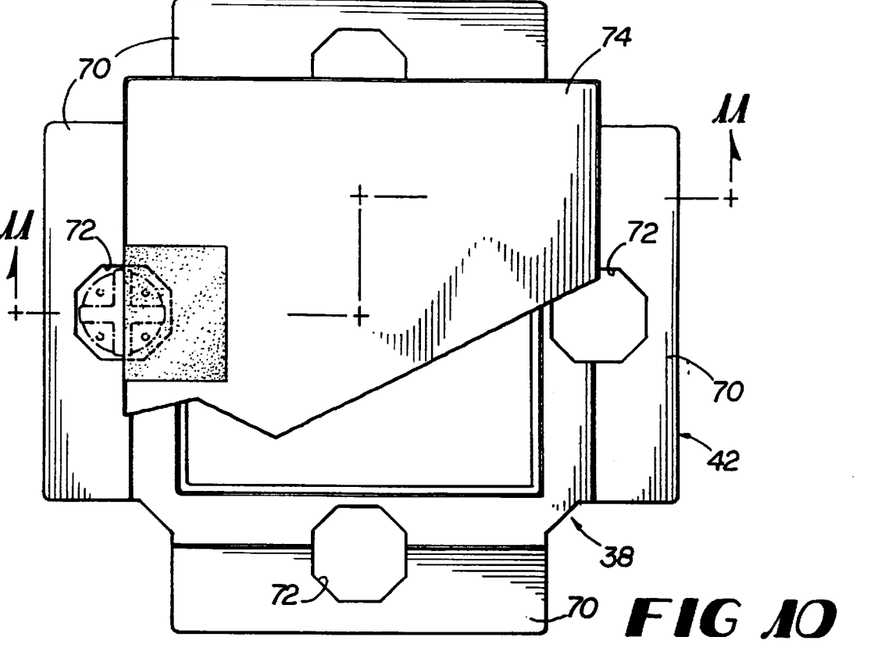
FIG. 10 is a top plan view of an embodiment of a junction box hatch cover in accordance with the present invention that provides a carpet support surface substantially coplanar with carpet support surfaces adjacent to the hatch cover, which is shown in place on the junction box of the present invention.
Figure 11:
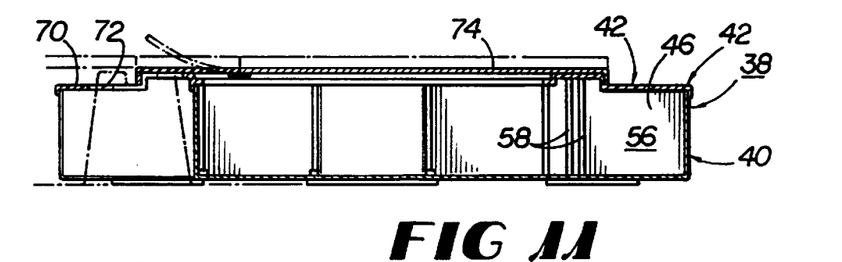
FIG. 11 is a side elevation view, in section, of the junction box and hatch cover shown in FIG. 10 taken along line 11—11 in FIG. 10 and illustrating a cable access apparatus in its closed and (in broken lines) open positions.
Figures 12, 13:
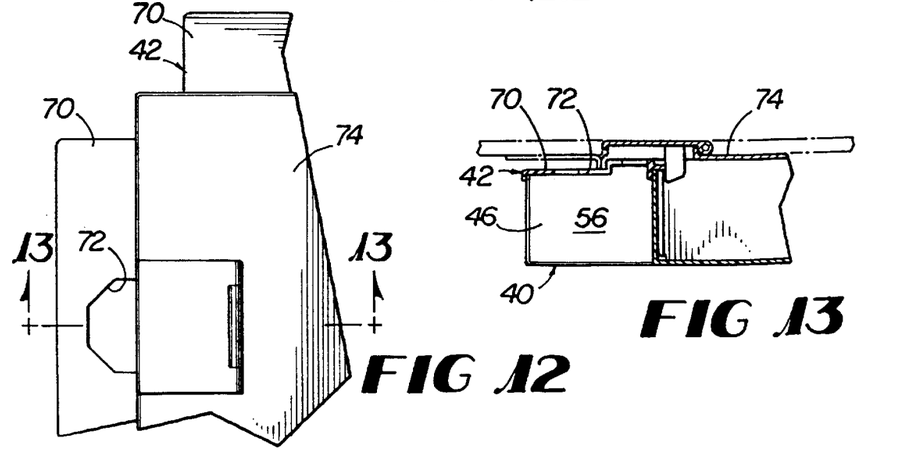
FIG. 12 is a top plan view similar to FIG. 10 showing a portion of an alternative embodiment of a hatch cover having a different cable access apparatus.
FIG. 13 is a side elevation view, in section, showing the cable access apparatus of FIG. 12.
Figure 14:
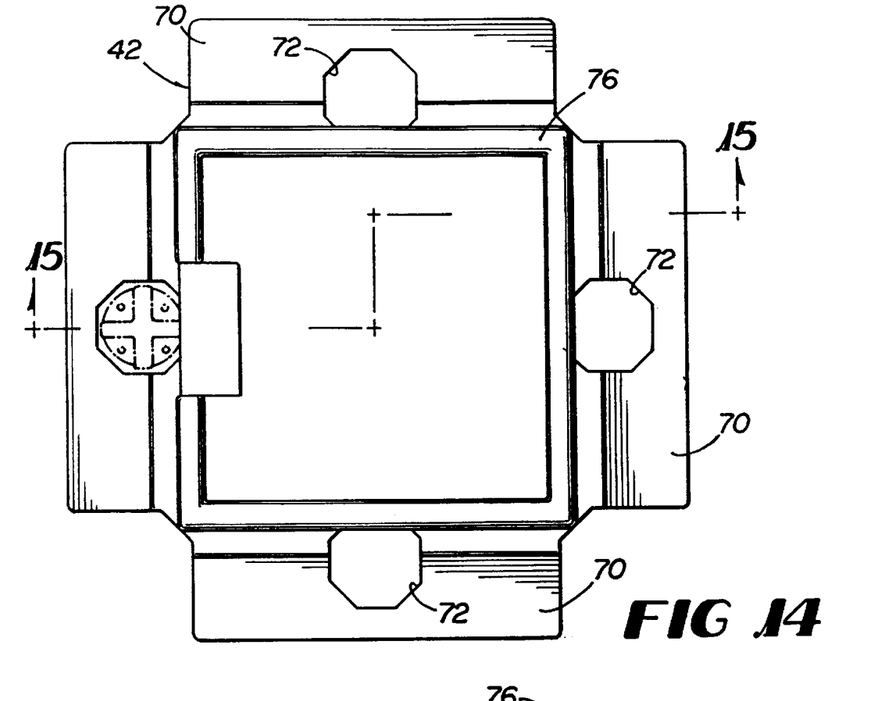
FIG. 14 is a top plan view of an embodiment of a junction box hatch cover that has a wide lip to make apparent the location of the junction box positioned under the hatch cover, which is shown in place on the junction box of the present invention.
Figure 15:
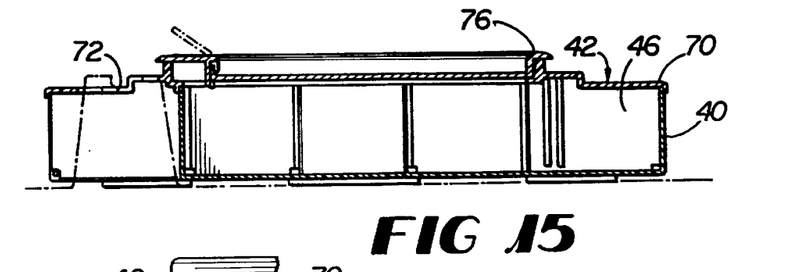
FIG. 15 is a side elevation view of the apparatus shown in FIG. 14 illustrating the cable access apparatus in its closed and (in broken lines) open positions.
Figures 16, 17:
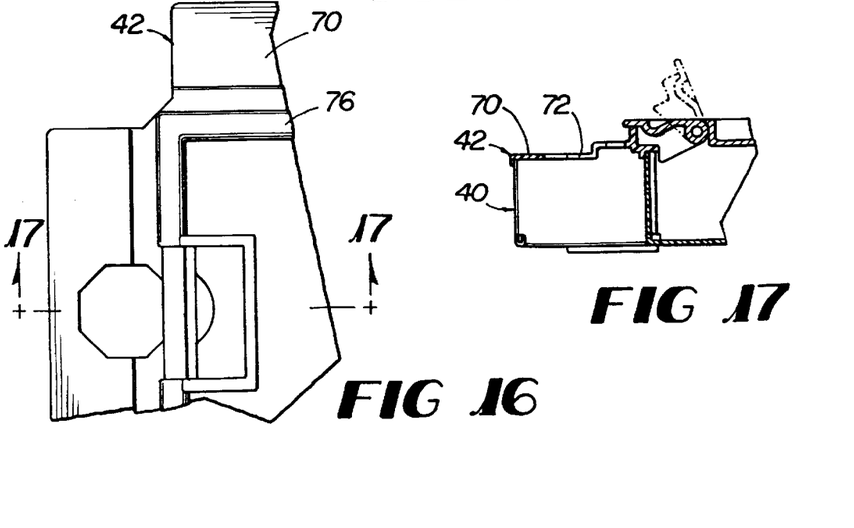
FIG. 16 is a top plan view of an alternative embodiment of the hatch cover shown in FIG. 14 with a different cable access apparatus.
FIG. 17 is a side elevation view, in section, showing the cable access apparatus of FIG. 16 in its closed and (in broken lines) open positions.

As may be readily understood by reference to the figures, the junction box 38 of the present invention generally comprises a housing 40 shown in top plan view in FIG. 7 and a cover 42 shown in FIGS. 7, and 8.

Figure 5:
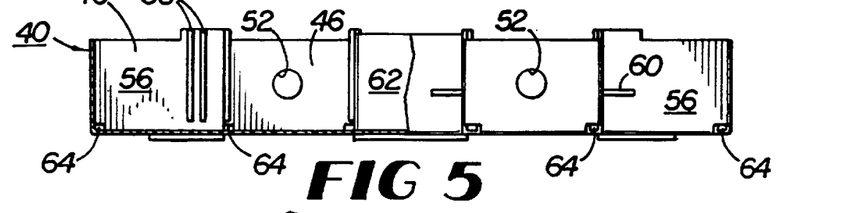
FIG. 5 is a side elevation view, in section, of the housing shown in FIG. 4 taken along line 5—5 in FIG. 4.
Figure 6:
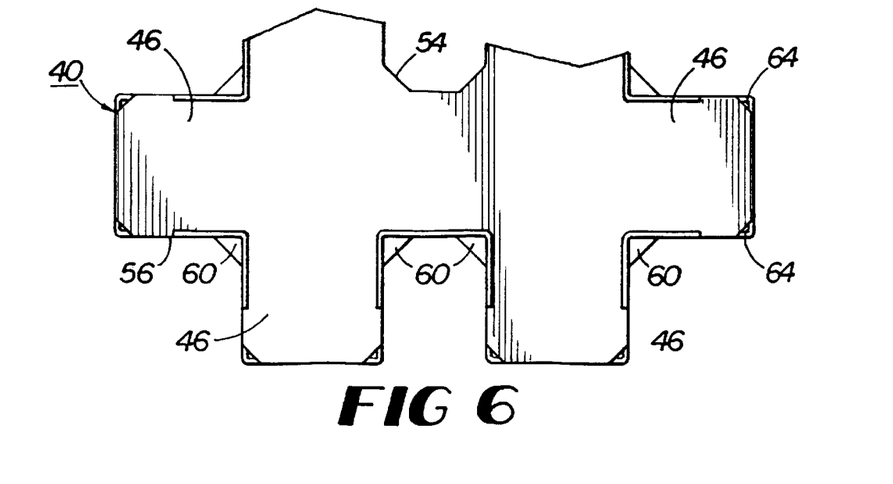
FIG. 6 is a bottom plan view of one-half of the housing shown in FIG. 4.
Figure 21:
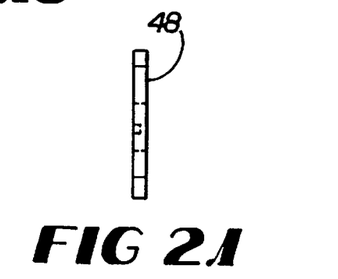
FIG. 21 is a side elevation view of the frame shown in FIG. 20.
Figure 22:
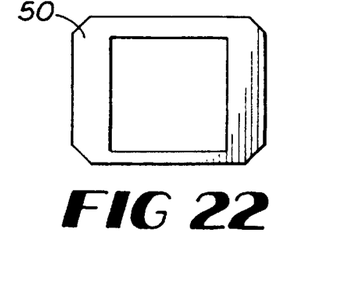
FIG. 22 is a front elevation view of a second typical receptacle frame for use in the junction box of the present invention.
Figure 23:
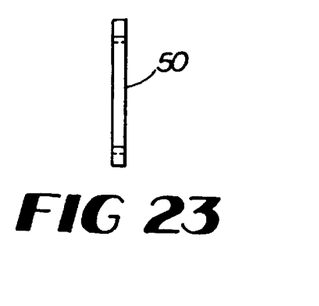
FIG. 23 is a side elevation view of the frame shown in FIG. 22.

Housing 40 has a central area 44 and eight receptacle boxes 46. Receptacle boxes 46 are separated from the central area 44 by slide-in frames such as frame 48 in FIGS. 20 and 21 or frame 50 in FIGS. 22 and 23. Frames are visible in FIGS. 1 through 3. The frames, such as frames 48 and 50, are received in tracks 58 on the insides of box walls 56. Cables enter boxes 46 through cable holes 52 visible in FIG. 5, and cables may be protected by cable feed-throughs shown positioned in cable holes 52 in FIGS. 1 through 3.

Figure 1:
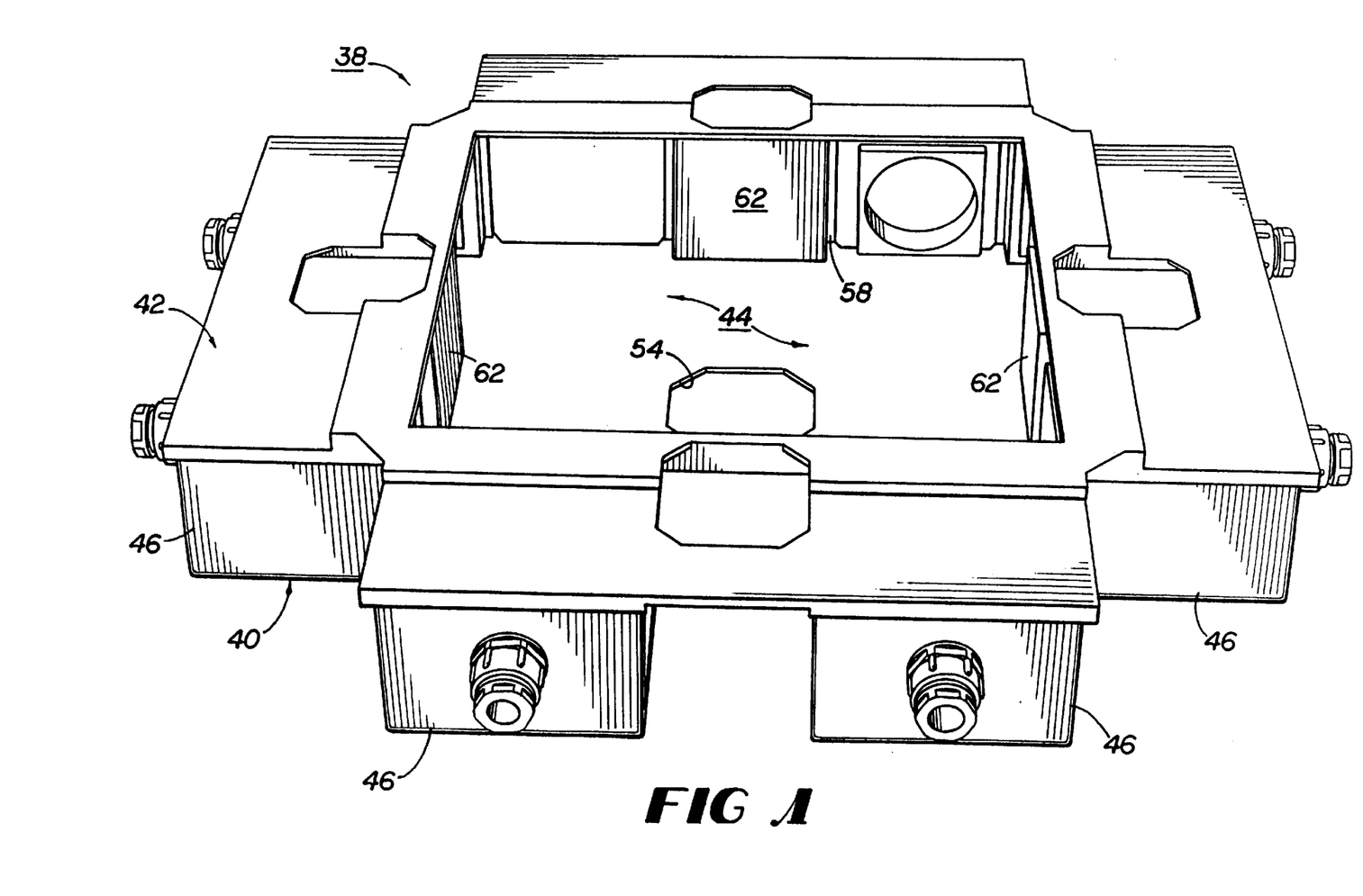
FIG. 1 is a perspective view of the top and one side of the junction box of the present invention.

Electrical or other components or cable connection means, such as outlets, may be easily attached to the central opening of the frames 48 and 50. Such attachment can occur by, for instance, providing the outlet with flexible prongs that bend when the outlet is inserted into the opening in order to allow insertion, then flex back to their original position to hold the outlet within the opening. As shown in FIGS. 20 through 23, numerous frames 48 and 50 with different sized openings may be formed of an inexpensive plastics type material and provided to installers of the housing 40. Frames 48 and 50 with the different sized openings allow easy installation of virtually any type of component, whether electrical outlet, data communication outlet or telephone jack, regardless of whether the same components are produced by different manufacturers. Frames 48 and 50 save significantly on installation time, and thus labor cost, since the installer need only snap the chosen outlet into the correct frame, slide each such assembled frame into the notch in the housing, and then place the housing among the pedestals, as shown in FIG. 1.

Frames may also be used with the housings 40 by providing snap-locking tabs on the outer edges of the frames. The tabs would hold the frames within the openings of the housings 40. Alternatively, the housings 40 could be modified to accept the frames by simply snipping away the portion of the housing 40 located beneath the opening to form a notch that readily accepts a frame. If the frames are formed of a good dielectric material, any electrical components will be isolated from the junction box housing. Such isolation eliminates the need for grounding the housing and allows compliance with various standards, such as European installation standards IP 2,4 and 7.

Figure 2:
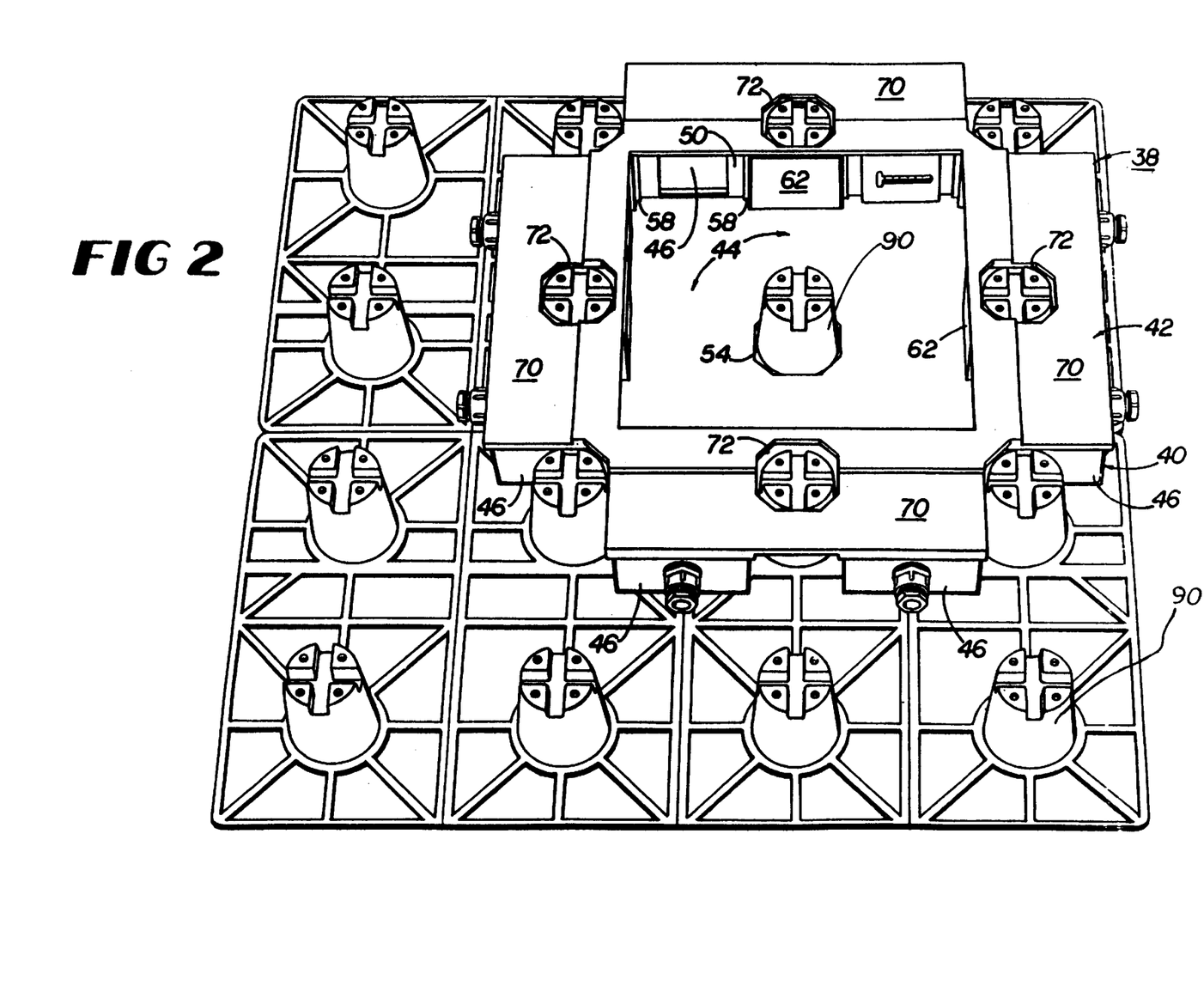
FIG. 2 is a perspective view of the junction box shown in FIG. 1, shown in position on a system of low profile raised flooring stand-off supports.
Figure 3:
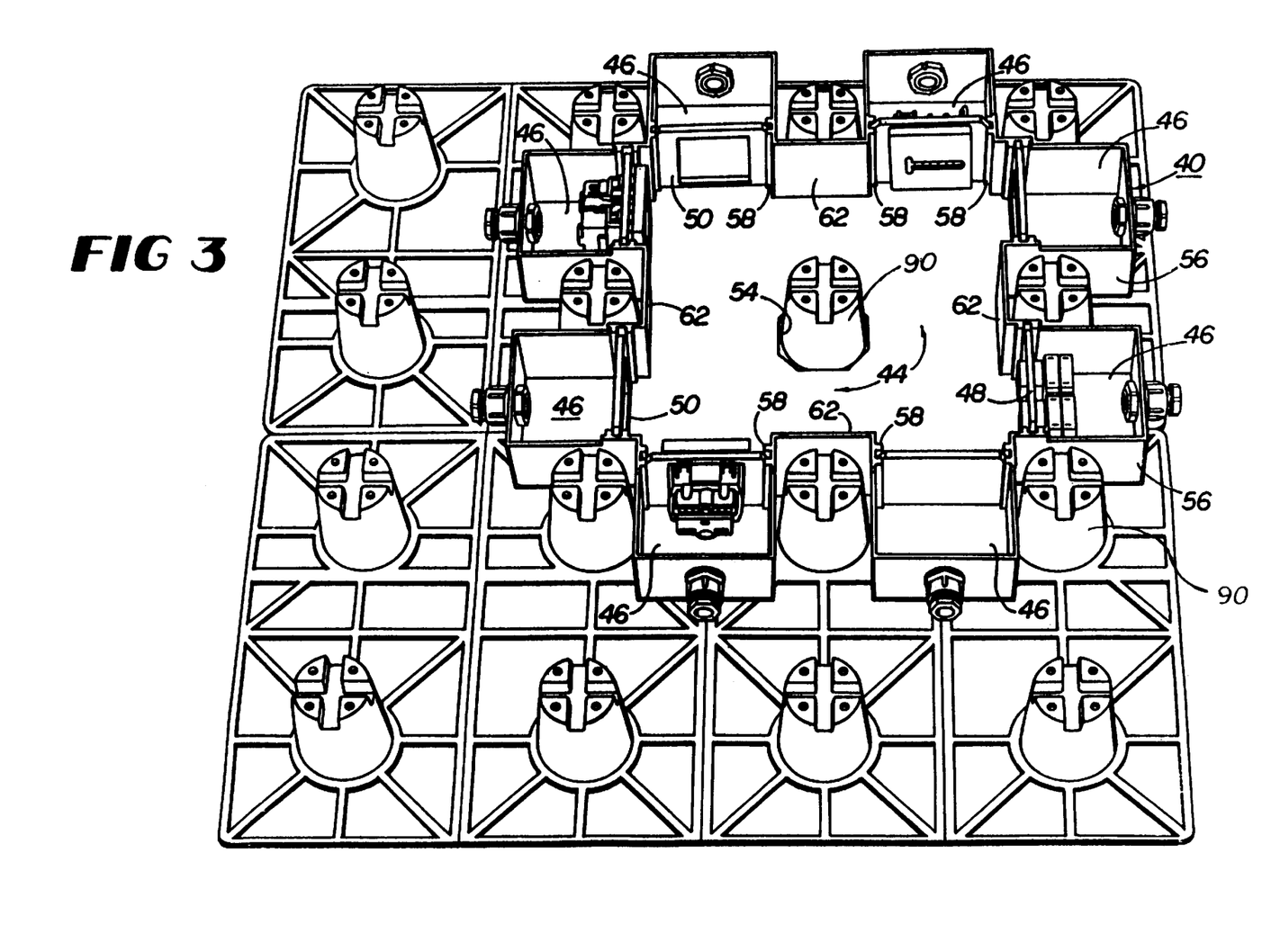
FIG. 3 is a perspective view similar to FIG. 2 with the junction box cover removed.
Figure 4:
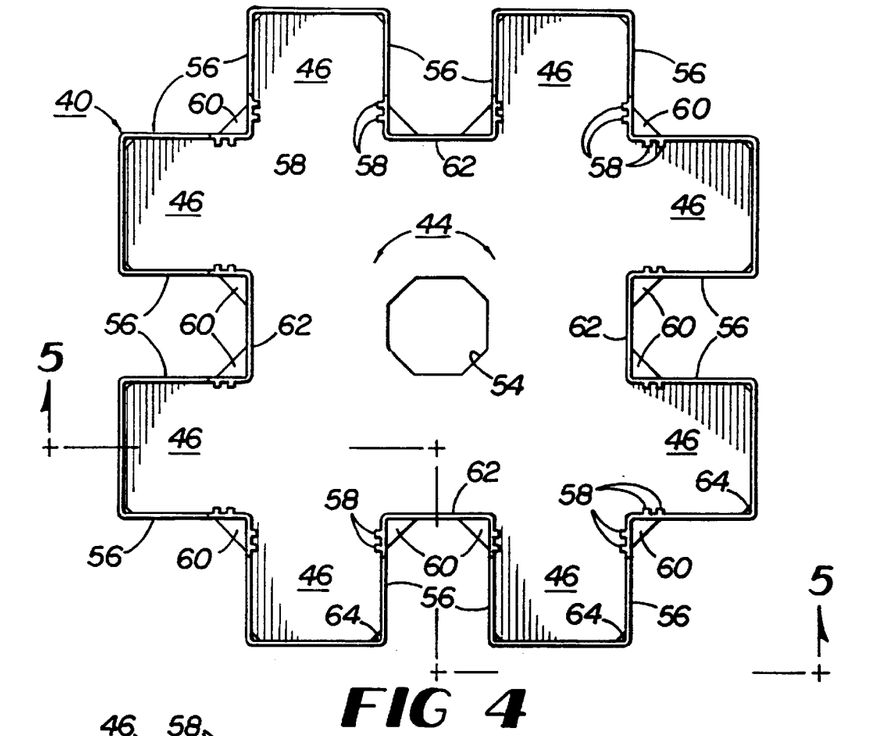
FIG. 4 is a top plan view of the housing of the junction box of the present invention.

As will be appreciated by reference to FIGS. 2 and 3, the junction box 38 comprising housing 40 and cover 42 is positioned on low profile raised flooring standoffs so that a standoff 90 protrudes through standoff opening 54 (visible in FIG. 4) and a standoff is positioned adjacent to each side 56 of each box 46.

Gussets 60 between adjacent box walls 56 and between box walls 56 and housing walls 62 reinforce and strengthen housing 40. Optional openings 64 at the bottom corners of boxes 46 provide drainage for any moisture that may accumulate in the boxes 46. Alternatively, such openings 64 may be omitted if it is desired that the box 38 be sealed against water entry from below as might occur if a substantial quantity of standing water accumulates on the floor.

FIGS. 7, and 8 illustrate the junction box cover 42 of the present invention. Cover 42 generally has a cruciform shape with a central hatch opening 66 defined by a hatch frame 68 and four box covering plates 70, each of which covers two boxes 46 and each of which has a laterally centered opening 72 that receives the top of a low profile raised flooring standoff.

Alternative hatch covers and cable access and cover devices are illustrated in FIGS. 10 through 17.

The hatch cover 74 illustrated in FIGS. 10–13 presents a carpet support surface generally coplanar with surfaces adjacent to the junction box. It may be fabricated of steel or plastic. By contrast, the hatch cover 76 illustrated in FIGS. 14–17 is typically made of plastic and presents a prominent frame to make apparent the location of the junction box.

Figure 18:
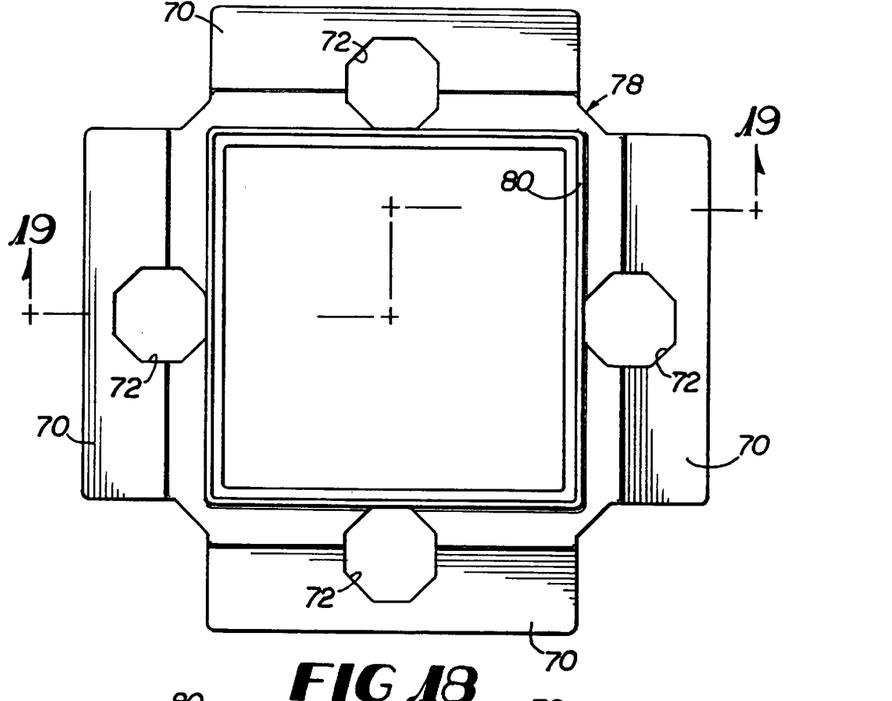
FIG. 18 is a top plan view of an embodiment of the junction box hatch cover of the present invention with an upstanding lip surrounding the junction box access hatch, which is shown in place on the junction box of the present invention.
Figure 19:
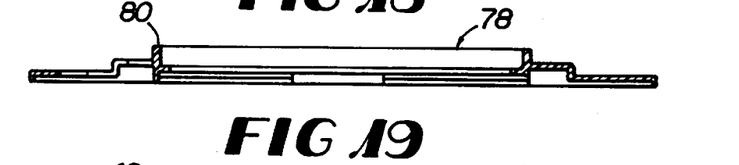
FIG. 19 is a side elevation view, in section, taken along line 19—19 of FIG. 18.
Figure 20:
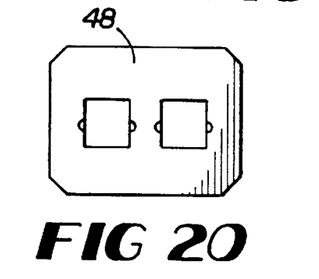
FIG. 20 is a front elevation view of a typical receptacle frame for use in connection with the junction box of the present invention.

FIGS. 18–20 illustrate an alternative junction box cover 78 that has a relatively tall upstanding lip 80.

As noted above, the principal components of the junction boxes and hatch covers of the present invention are desirably manufactured from polypropylene, although a variety of other thermoplastic and thermoset resin systems and materials may be used in appropriate heat-forming injection molding or other fabrication techniques. Such resin systems may be used with a wide variety of appropriate fillers and reinforcement materials, particularly including fiber reinforcement materials such as fiberglass.

As will be appreciated by those skilled in the art, once the junction box 38 of the present invention is installed (including the cover 42) together with a hatch cover and other components of a floor system, any water showered onto the box from above (as in IP 2.4.7) is deflected around the box, and little if any such water enters the box.

The foregoing is provided for purposes of explanation and disclosure of preferred embodiments of the present invention. For instance, the shape of the junction box housing or receptacle boxes may be modified, yet still fall within the following claims. Further modifications and adaptations to the described embodiments will be apparent to those skilled in the art and may be made without departing from the scope or spirit of the invention and the following claims.

What is claimed is:

1. A junction box for use with a false flooring system having stationery standoffs for supporting floor panels comprising:
   (a) a housing comprising a plurality of side walls joined to form a closed perimeter; and
   (b) at least one receptacle container for enclosing outlets comprising a plurality of perimeter walls, joined to one of the side walls of the housing at an aperture; and
   (c) a cover comprising a top surface for enclosing outlets within the receptacle container, whereby the standoffs protrude between the receptacle containers and through the cover.

2. A junction box according to claim 1 in which the at least one receptacle container further comprises a means for coupling to a cable passing through one of the perimeter walls.

3. A junction box for use with a false flooring system having standoffs for supporting floor panels, the junction box comprising a housing, a plurality of receptacle containers, and a cover for enclosing outlets placed within the receptacle containers, wherein the cover comprises openings through which the standoffs protrude.

4. A junction box according to claim 3 in which the housing forms a generally square perimeter and at least one of the receptacle containers is located on at least one housing side wall, adjacent to each side of the generally square perimeter.

5. The junction box of claim 3 in which the housing has an aperture.

6. The junction box of claim 5 further comprising a frame, adapted to be located in the aperture for accepting a cable connector, the frame comprising a central opening for accepting the cable connector.

7. The junction box of claim 6 further comprising means for attaching the frame to the aperture.

8. A junction box for use with a false flooring system having generally immovable standoffs for supporting floor panels, the junction box comprising a housing, forming a central area surrounded by a plurality of receptacle containers, and means for contacting a selected group of the standoffs in order to position the junction box within the flooring system, wherein the function box housing and receptacle containers are formed as a single-piece to allow for efficient positioning among the selected group of the standoffs.

9. The junction box of claim 8 in which the housing has at least two side walls, one of which has an aperture.

10. The junction box of claim 9 further comprising a frame, adapted to be located in the aperture for accepting a cable connector, the frame comprising a central opening for accepting the cable connector and means for attaching the frame to the aperture.

11. The junction box of claim 8 in which the attaching means comprises a groove, disposed between an interior space of at least one of the receptacle containers and the central area, which allows for removable insertion of the frame into the aperture.

12. The junction box of claim 11 further comprising a cover for enclosing outlets within at least one of the receptacle containers, whereby the standoffs protrude between the receptacle containers and through the cover.

* * * * *

UNITED STATES PATENT AND TRADEMARK OFFICE
CERTIFICATE OF CORRECTION

PATENT NO. : 5,828,001
DATED : October 27, 1998
INVENTOR(S) : Jan J. Schilham

It is certified that error appears in the above-indentified patent and that said Letters Patent is hereby corrected as shown below:

On cover page under Attorney, Agent or Firm delete "Mitchell G. Stokwell" and insert     --Mitchell G. Stockwell--

Column 5, line 40, delete "The" and insert --the--

Signed and Sealed this

Third Day of April, 2001

*Attest:*

NICHOLAS P. GODICI

*Attesting Officer*     *Acting Director of the United States Patent and Trademark Office*